M. A. WALDEN.
COOKING VESSEL AND COVER THEREFOR.
APPLICATION FILED FEB. 13, 1919.
1,344,836.
Patented June 29, 1920.
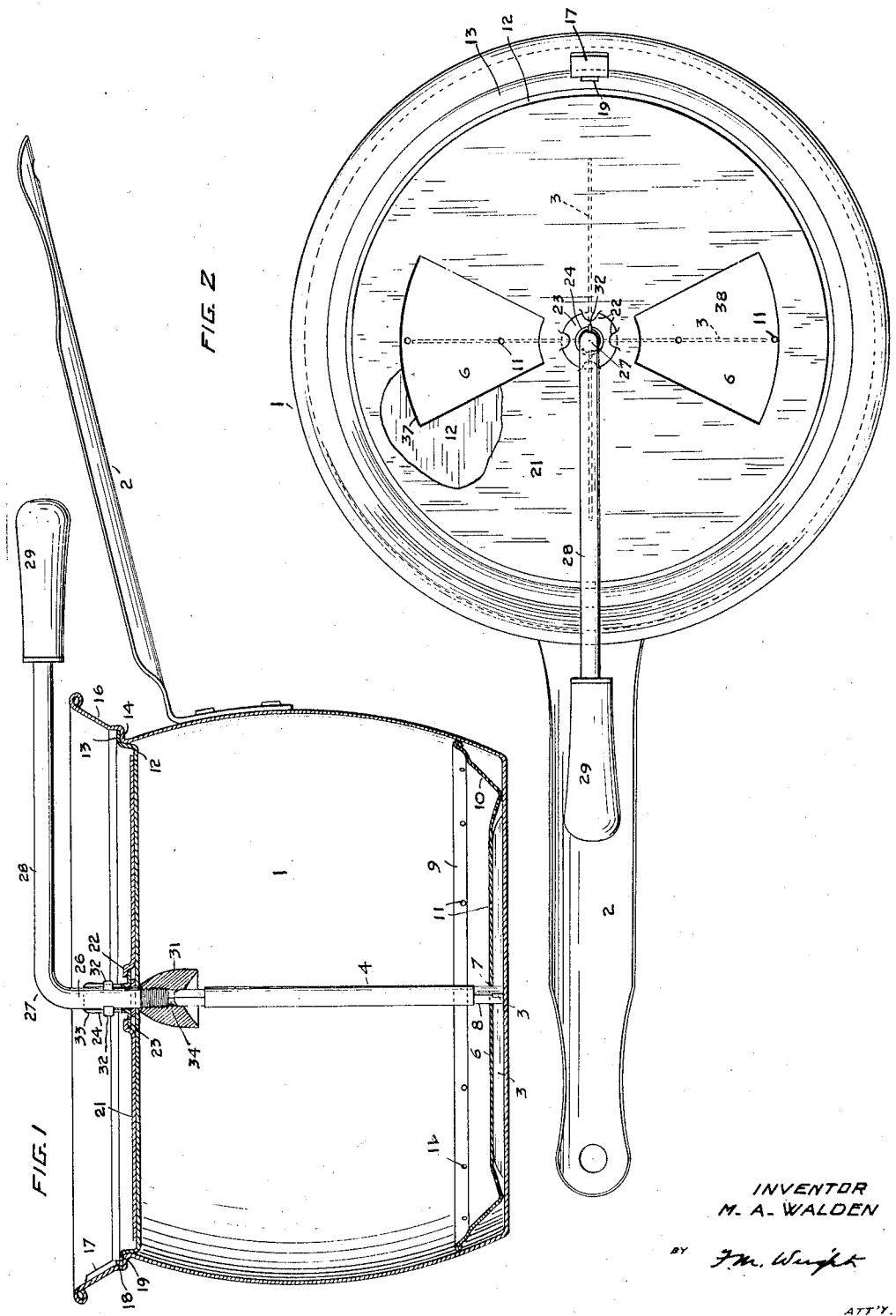
INVENTOR
M. A. WALDEN
BY F. M. Wright
ATT'Y.

UNITED STATES PATENT OFFICE.

MARCUS A. WALDEN, OF SAN FRANCISCO, CALIFORNIA, ASSIGNOR TO FRANK DRABER, OF SAN FRANCISCO, CALIFORNIA.

COOKING VESSEL AND COVER THEREFOR.

1,344,836. Specification of Letters Patent. Patented June 29, 1920.

Application filed February 13, 1919. Serial No. 276,803.

*To all whom it may concern:*

Be it known that I, MARCUS A. WALDEN, a citizen of the United States, residing at San Francisco, in the county of San Francisco and State of California, have invented new and useful Improvements in Cooking Vessels and Covers Therefor, of which the following is a specification.

The present invention relates to improvements in cooking vessels, one object of the invention being to provide a cooking vessel of which the contents will be prevented from burning, in which said contents can be readily stirred from the outside, and from which the steam or vapor can be allowed to escape or not as may be desired.

A further object is to provide a lid of such a vessel equipped with means for stirring the contents of the vessel, which means will be brought into operative relation with the stirring means within the vessel by the mere operation of placing the lid upon the vessel.

A further object is to provide a lid which can be also used as a strainer when desired.

A further object is to provide, with such a lid, means for stirring the contents of the vessel, or for opening or closing apertures in said lid, which can be operated without the danger of the operator's hand being scalded by the steam rising from the vessel.

In the accompanying drawing, Figure 1 is a central vertical section through the vessel; Fig. 2 is a plan view thereof.

Referring to the drawing, 1 indicates a round cooking vessel, which is for the most part of the usual form, and has riveted thereto a metal handle 2. In the bottom of the vessel are stirrer arms 3, secured to the bottom of the central vertical stem 4, and extending therefrom at right angles thereto and to one another. Supported upon said arms is a false bottom 6, having a square central hole 7 through which extends a squared lower part 8 of said stem. Said false bottom, where it extends beyond said stirrer arms 3, curves downwardly into close proximity with the bottom of the vessel, and then conically upward, as shown at 10, its outer edge being in close proximity to the round side of the vessel. Said bottom is formed, not only in its main body, but also in its flange 9 with perforations 11.

12 indicates a circular lid for the vessel having a flange 13 which can rest on an inwardly extending circular bead or shoulder 14 in the side of the vessel near the top. The vessel then flares outwardly, as shown at 16, above said circular shoulder to its upper edge. On said flaring portion 16, preferably diametrically opposite to the handle 2, is secured a small plate 17, having a tooth 18 extending downwardly into close proximity to said shoulder. The lid 12 has in its flange 13 a notch 19, which can receive said tooth 18 and thus prevent the turning of the lid with reference to the vessel.

Resting on said lid, and concentric therewith, is a cover 21, formed integrally near its center with four prongs 22, which extend inwardly toward the center of the cover and overlie and grip tightly and secure to the cover the margin of the base 23 of a cylindrical sleeve 24 rising vertically from said base. Extending through said sleeve is a lower vertical portion 26 of a stem 27, an upper portion 28 of which extends horizontally beyond the edge of the vessel and upon its outer end is mounted a heat-insulating handle 29. The end of said lower or vertical portion 26 of said stem 27 below the lid 12 is threaded, and upon said threaded lower end is screwed a bell-shaped nut 31. Said nut 31, when screwed on said threaded lower end, is arrested in such a position that there is left an interval of about one-eighth of an inch between the upper side of the nut and the lower side of the lid 12, the upper movement of the lid and cover being limited by the engagement with two lugs 32 projecting from opposite sides of the lower vertical portion of the stem 27, into opposite vertically extending slots 33, open at their upper ends, in the sleeve 24. This arrangement allows the lid and cover to move vertically with reference to the nut and stem, while the cover is compelled to turn with said stem.

The lower portion 34 of the vertical aperture through the nut, which aperture is threaded to screw on the threaded lower end of the stem, is made square, and the lower surface 36 of the nut is made conical, so that, when the lid is placed in position, the upper end of the stem 4 will be guided into the central hole in the nut. The upper end of the stem 4 is made square and fits snugly within the square lower portion of said hole so that, when the lid is in position, the stem 4 is operatively connected with the nut, and, therefore, with the stem 27. Hence, upon revolving the handle 29, the stem 4, and with its the stirrer arms 3 and the false bottom 6 will also be rotated. This operative connection is completed automatically upon placing the lid in position and is disconnected automatically on removing it therefrom. The lid and cover are formed each with a pair of diametrically opposite segmentally shaped apertures 37 and 38.

In one position of the lid and cover, the apertures of the lid register with the apertures of the cover, so that steam can escape therethrough. In another position, the apertures are closed.

The construction and arrangement of the apertured lid and cover and the parts immediately related thereto form an important improvement irrespective of the stirring arms or the false bottom. The apertures are preferably so located in the cover with reference to the handle 2 that, when the apertures in the cover register with those in the lid, the handle 29 is immediately over the handle 2 of the vessel. In this position, both of these handles can be grasped in a single hand and the vessel can be tilted so as to allow the liquid contents thereof to be discharged through the registering apertures 37 and 38 in the lid and cover.

The insulating handle on the stem 27 being entirely outside or beyond the rim of the vessel, a person can manipulate the handle, and so close or open the registering holes in the lid and cover, without danger of his hand being scalded by the steam rising from the interior of the vessel.

The arrangement whereby the lid and cover have a slight vertical movement with reference to the vertical portion of the stem enables said lid and cover to form a strainer. In order that these members may act as a strainer, the cover is turned until the apertures 37 and 38 are out of register with each other, and then, when the vessel is inverted, since the lid and cover do not make a watertight joint with each other, its liquid contents escape through the space between them, while at the same time its solid contents are retained, being unable to pass through said narrow space.

The stem 27 having the handle 29 is an important feature of my invention. It performs many offices; it revolves the stirrer and also the false bottom; it opens and closes the holes 37, 38, in the lid and cover; it can be used to remove both the lid and cover; it can be detached from the stirrer and false bottom by being merely lifted; when replaced, it automatically becomes attached thereto—it is so arranged that the handle is always comparatively cool, and is away from steam arising from the vessel; and, finally, it can be easily detached from all other parts of the cooking vessel for the purpose of cleaning by merely unscrewing the nut and lifting the stem from the cover.

I claim:—

In combination with a cooking vessel, a circular lid, a circular cover thereon said lid and cover having eccentric holes therethrough, a stem for turning one of said elements relatively to the other, said stem having a portion extending outwardly beyond the upper edge of the cooking vessel, a nut screwed on the lower end of said stem, a stirrer in the bottom of the vessel, a vertical stem for said stirrer, the upper end of the stem being angular, and said nut having an angular recess to receive said angular upper end, and a perforated false bottom having an angular central aperture to receive said stirrer stem, the portion of the stem which is received in said aperture being also angular.

MARCUS A. WALDEN.